(12) United States Patent
Ourion et al.

(10) Patent No.: US 10,615,664 B2
(45) Date of Patent: Apr. 7, 2020

(54) CRADLE FOR AN ELECTRIC MACHINE, AND ASSOCIATED TRANSMISSION SYSTEM

(71) Applicant: GE Energy Power Conversion Technology Limited, Rugby, Warwickshire (GB)

(72) Inventors: Emilie Ourion, Champigneulles (FR); Fabien Roche, Champigneulles (FR)

(73) Assignee: GE Energy Power Conversion Technology Limited, Warwickshire (GB)

( * ) Notice: Subject to any disclaimer, the term of this patent is extended or adjusted under 35 U.S.C. 154(b) by 166 days.

(21) Appl. No.: 15/545,364

(22) PCT Filed: Jan. 20, 2016

(86) PCT No.: PCT/EP2016/051118
§ 371 (c)(1),
(2) Date: Oct. 31, 2017

(87) PCT Pub. No.: WO2016/116495
PCT Pub. Date: Jul. 28, 2016

(65) Prior Publication Data
US 2018/0041092 A1 Feb. 8, 2018

(30) Foreign Application Priority Data
Jan. 21, 2015 (EP) .................................... 15305061

(51) Int. Cl.
*H02K 1/18* (2006.01)
*H02K 5/16* (2006.01)
(Continued)

(52) U.S. Cl.
CPC ............... *H02K 5/24* (2013.01); *H02K 1/185* (2013.01); *H02K 5/161* (2013.01); *H02K 7/14* (2013.01);
(Continued)

(58) Field of Classification Search
CPC ...... H02K 5/24; H02K 17/16; H02K 15/0006; H02K 7/14; H02K 1/185; H02K 5/161
(Continued)

(56) References Cited

U.S. PATENT DOCUMENTS 2,112,747 A * 3/1938 Wood ..................... H02K 1/185
    310/216.131
3,064,152 A * 11/1962 Gueck ..................... H02K 9/06
    310/426

(Continued)

FOREIGN PATENT DOCUMENTS

| DE | 1 488 040 A1 | 4/1969 |
|---|---|---|
| DE | 3506628 A1 | 8/1986 |
| FR | 2 318 527 A1 | 2/1977 |

OTHER PUBLICATIONS

Misumi bearing, catalog, https://us.misumi-ec.com, printed on Nov. 20, 2019.*

(Continued)

*Primary Examiner* — John K Kim
(74) *Attorney, Agent, or Firm* — Wood IP LLC (57) ABSTRACT

A cradle for an electric machine comprises a frame delimiting a seat for receiving part of the machine and extending in a vertical direction and comprising a lower edge and an upper edge, the lower edge being intended for connection to a support.

The upper edge comprises one or two receiving seats able to receive a respective bearing and comprising a base wall and two side walls.

9 Claims, 5 Drawing Sheets

(51) Int. Cl.
*H02K 5/24* (2006.01)
*H02K 7/14* (2006.01)
*H02K 15/00* (2006.01)
*H02K 17/16* (2006.01)

(52) U.S. Cl.
CPC ......... *H02K 15/0006* (2013.01); *H02K 17/16* (2013.01)

(58) Field of Classification Search
USPC .............. 310/51, 89, 90, 418, 425, 426, 428
See application file for complete search history.

(56) References Cited

U.S. PATENT DOCUMENTS

| | | | |
|---|---|---|---|
| 3,114,061 A | 12/1963 | Michel et al. | |
| 4,079,275 A | 3/1978 | Fu | |
| 4,426,163 A * | 1/1984 | Schluchter | F16M 1/04 310/90 |
| 6,091,177 A * | 7/2000 | Carbonell | H02K 5/24 310/426 |
| 6,628,027 B2 * | 9/2003 | Fuller | H02K 1/185 310/51 |
| 7,237,958 B2 * | 7/2007 | Giberson | F16C 35/04 384/308 |
| 7,682,085 B2 * | 3/2010 | Thelen | F16C 27/02 384/438 |
| 8,319,405 B2 * | 11/2012 | Allen | H02K 1/185 310/413 |
| 8,608,608 B1 | 12/2013 | Simpkins | |
| 9,015,925 B2 * | 4/2015 | Hoell | H02K 15/00 29/596 |
| 9,190,890 B2 * | 11/2015 | Allen | H02K 15/0006 |
| 2002/0074894 A1 * | 6/2002 | Fuller | H02K 1/185 310/216.113 |
| 2012/0062062 A1 * | 3/2012 | Lienard | H02K 1/185 310/91 |
| 2018/0041092 A1 * | 2/2018 | Ourion | H02K 1/185 |

OTHER PUBLICATIONS

Motion Industries bearing, catalog, https://www.motionindustries.com/taxonomy/Bearings, printed on Nov. 20, 2019.*
Extended European Search Report and Opinion issued in connection with corresponding EP Application No. 15305061.2 dated Aug. 7, 2015.
International Search Report and Written Opinion issued in connection with corresponding PCT Application No. PCT/EP2016/051118 dated May 25, 2016.

* cited by examiner

CRADLE FOR AN ELECTRIC MACHINE, AND ASSOCIATED TRANSMISSION SYSTEM

BACKGROUND TO THE INVENTION

The present invention relates to a cradle for an electric machine, the electric machine comprising a stator, a transmission shaft, a rotor connected to the shaft, and two bearings, of the flange-mounted type, for supporting the transmission shaft. The cradle comprises a frame delimiting a seat for receiving part of the machine, the frame extending in a vertical direction and comprising a lower edge and an upper edge, the lower edge being intended for connection to a support.

BRIEF DESCRIPTION OF THE INVENTION

An embodiment of the present invention also relates to a transmission system comprising an electric machine of this type and a cradle of this type able to receive the machine.

An embodiment of the invention can be applied in particular to high-power electric machines, such as those with a power greater than 10 MW, more particularly greater than 50 MW, in particular in the fields of natural resource pumping, gas compression, or production installations in chemical, petrochemical and oil industries. For electric machines of this type, the rotational speed of the rotor is generally greater than 1,000 revolutions per minute, more particularly greater than 3,000 revolutions per minute.

A cradle and an electric machine, in particular an electric motor, of the aforementioned type, and more particularly an asynchronous motor, in particular with bipolar polarity, are known. The electric motor is supported by the cradle, the cradle being a mechanical part on the one hand supporting the stator and on the other hand comprising grooves for receiving bearings supporting the transmission shaft.

For high-power electric motors, the levels of vibrations recorded at the cradle are generally high and weaken the cradle and the bearings, which leads to premature wear of the motor. The strong vibrations observed are generally caused by resonance, the speed of operation of the motor generating associated forces, excitations and vibrations of which the frequency corresponds to the resonance frequency of the cradle.

The frame of the cradle thus generally comprises vertical reinforcement ribs extending in the vertical direction between the lower edge and the upper edge of the frame and substantially perpendicularly to a longitudinal direction. These ribs form an armature and serve to add rigidity to the structure of the cradle.

However, a cradle of this type is not suitable for increasingly powerful electric machines generating vibrations of increasingly greater amplitude.

An embodiment of the invention thus aims to propose a cradle for a rotating electric machine making it possible to improve the strength with respect to mechanical vibrations, in particular for rotational speeds of the rotor between 60% and 100% of the nominal speed thereof, and therefore to reduce the wear of the machine.

To this end, embodiments of the invention relates to a cradle of the aforementioned type, in which the upper edge comprises one or two receiving seats, each receiving seat being able to receive a respective bearing and comprising a base wall and two side walls.

In accordance with further aspects of the invention, the cradle comprises one or more of the following features, taken individually or in any technically feasible combination: the cradle comprises, for at least one receiving seat, two side walls protruding with respect to the upper edge of the frame in the vertical direction.

The cradle also comprises at least one removable bearing support, which is fixed in the seat and on which the bearing is fixed, said bearing support being suitable for increasing the rigidity of the bearings in the axial direction and for disassembling or assembling the rotor in the electric machine in the axial direction without contact with the cradle, the bearing support also comprising at least one vertical rib having a concave upper edge able to receive the mounting flange of the bearing, the vertical rib being in abutment against or fixed to the base wall and extending transversely in a transverse direction between two side walls fixed to the side walls of the cradle.

The cradle comprises at least one seat comprising a vertical rib having a concave upper edge suitable for receiving the mounting flange of the bearing, the vertical rib extending vertically from the base wall and transversely in a transverse direction between the side walls; at least one seat comprises oblique ribs extending in the longitudinal direction from one side or from either side of the vertical rib, and obliquely with respect to the transverse and vertical directions between the base wall and the side walls; the height of the or each side wall in the vertical direction is at least equal to a fifth of the height of the frame in the vertical direction, in an embodiment at least equal to a quarter of the height of the frame in the vertical direction.

The frame comprises two longitudinal flanks extending substantially in a longitudinal direction, two transverse flanks extending substantially in a transverse direction and mechanically connected to the longitudinal flanks, the frame also comprising at least one additional flank arranged between a longitudinal flank and a respective transverse flank and extending obliquely with respect to the longitudinal and transverse directions; the frame comprises four additional flanks and is octagonal in a section in a plane perpendicular to the vertical direction; the frame also comprises vertical reinforcement ribs extending in the vertical direction between the lower edge and the upper edge.

An embodiment of the invention also relates to a transmission system comprising an electric machine comprising a stator, a transmission shaft, a rotor connected to the shaft, and two bearings of the flange-mounted type for supporting the transmission shaft.

The transmission system also comprises a cradle as defined above, able to receive said machine.

BRIEF DESCRIPTION OF THE DRAWINGS

The invention will be better understood upon reading the following detailed description, given solely by way of example and with reference to the accompanying drawings, in which.

DETAILED DESCRIPTION OF THE INVENTION

Figure 1:
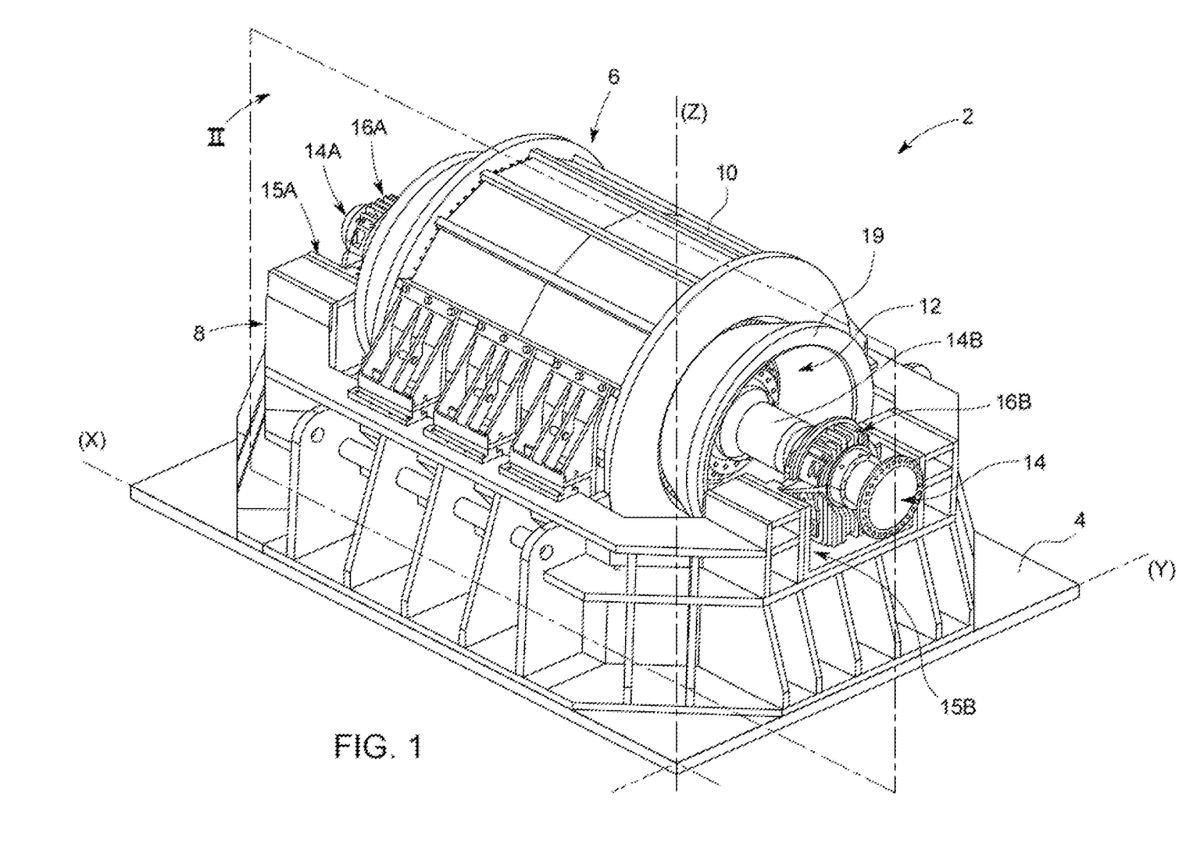
FIG. 1 is a perspective view of a transmission system, the transmission system comprising an electric machine and a cradle able to receive said machine, the machine comprising a stator, a transmission shaft, a rotor connected to the shaft, two bearings for supporting the transmission shaft, and two bearing supports fixed to the cradle.
Figure 2:
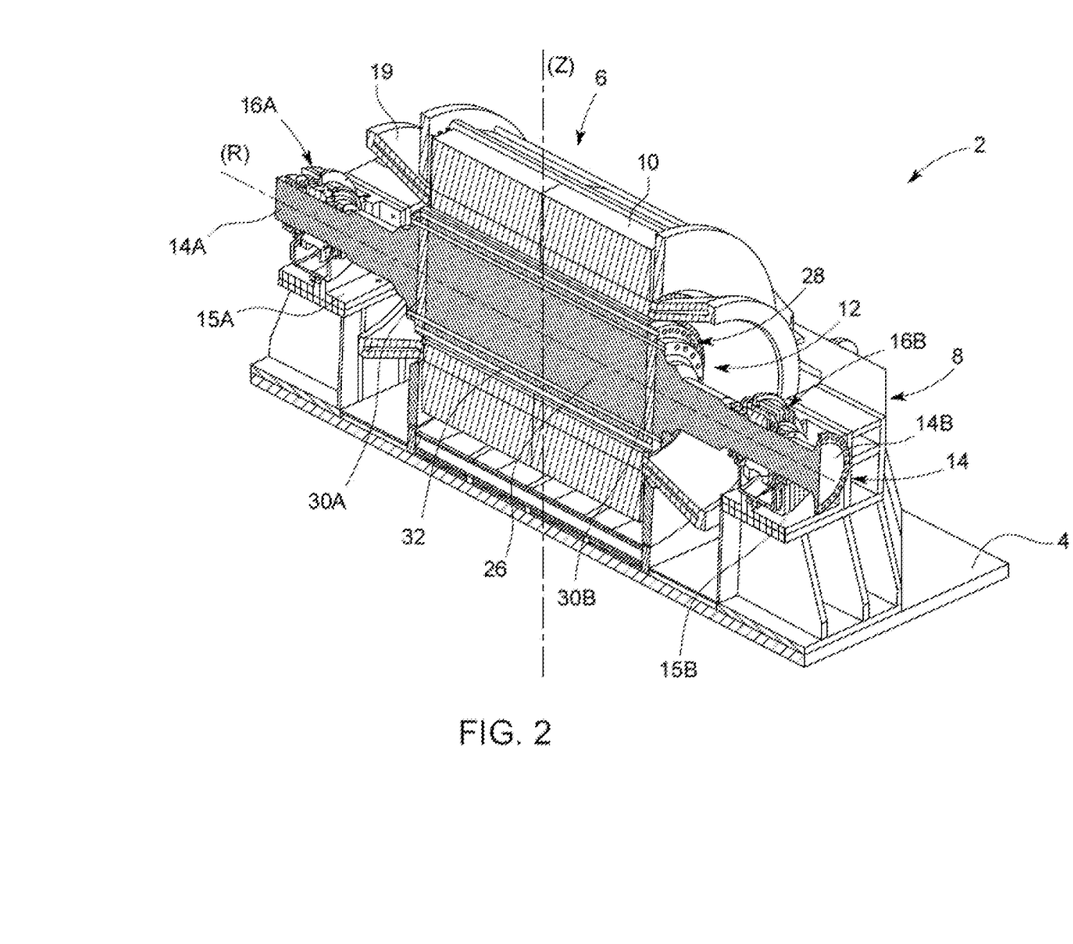
FIG. 2 is a sectional view along the plane II of FIG. 1.

The transmission system 2, illustrated in FIGS. 1 and 2, is placed or fixed on a planar support 4. Hereinafter, the term "vertical" in the description is defined as being the vertical direction with respect to the planar support 4, shown by the axis Z in the drawings, and the term "horizontal" is defined as being parallel to the support 4. A system of axes X and Y is also defined on the support 4, such that the axis X is perpendicular to the axis Y.

The transmission system 2 extends substantially longitudinally in the direction X, also referred to as the longitudinal direction.

The transmission system 2 comprises an electric rotating machine 6 and a cradle 8.

The electric machine 6 is for example an electric motor that is coupled to a compressor (not shown) for the compression of gas into liquefied gas and that has a power more particularly greater than 60 MW.

The electric motor 6 comprises a stator 10, a rotor 12, a transmission shaft 14, a first bearing 16A and a second bearing 16B. The bearings 16A and 16B are of the flange-mounted type and are fixed on the bearing supports 15A and 15B, which are in turn fixed to the cradle 8.

The stator 10 is received in the cradle 8 and has a tubular shape extending along an axis of direction parallel to the longitudinal axis X. The stator 10 has an inner radius making it possible to receive the rotor 12.

The stator 10 comprises one or more windings 19 through which a current flows and which thus produce a rotating magnetic field, which is capable of rotating the rotor 12.

The rotor 12 is in the form of a cylinder, extending along a direction parallel to the longitudinal axis X, and is disposed within the stator 10. The rotor 12 is also mounted rotatably with respect to the stator 10 along an axis of rotation R parallel to the axis X. During the operation of the motor 6, the rotor 12 has a rotational speed about the axis R.

The rotor 12 comprises a magnetic mass 26 and a short-circuit cage 28. The magnetic mass 26 is formed by a stack of rotor laminations. The short-circuit cage 28 comprises two electrical and mechanical short-circuit rings 30A and 30B located opposite one another, on either side of the rotor 12 and along the axis R. The short-circuit cage 28 also comprises a plurality of conductive bars 32 extending longitudinally parallel to the axis R in the median part of the rotor 12 and electrically connecting the short-circuit rings 30A and 30B.

The transmission shaft 14 is connected to the rotor 12. Here, it comprises two shaft stubs 14A and 14B extending on either side of the rotor 12. Each of the two shaft stubs 14A and 14B has a first end and a second end. The first end of the shaft stub 14A is fixed to the short-circuit ring 30A, and the second end of the shaft stub 14B is fixed to the short-circuit ring 30B respectively.

The two bearings 16A and 16B are received in the cradle 8. They have a tubular shape. The first bearing 16A and the second bearing 16B are able to receive the second end of the shaft stub 14A and that of the shaft stub 14B respectively.

The two bearings 16A and 16B are for example plain bearings with oil lubrication. In a variant, the bearings 16A, 16B are rolling bearings or magnetic bearings.

Figure 3:
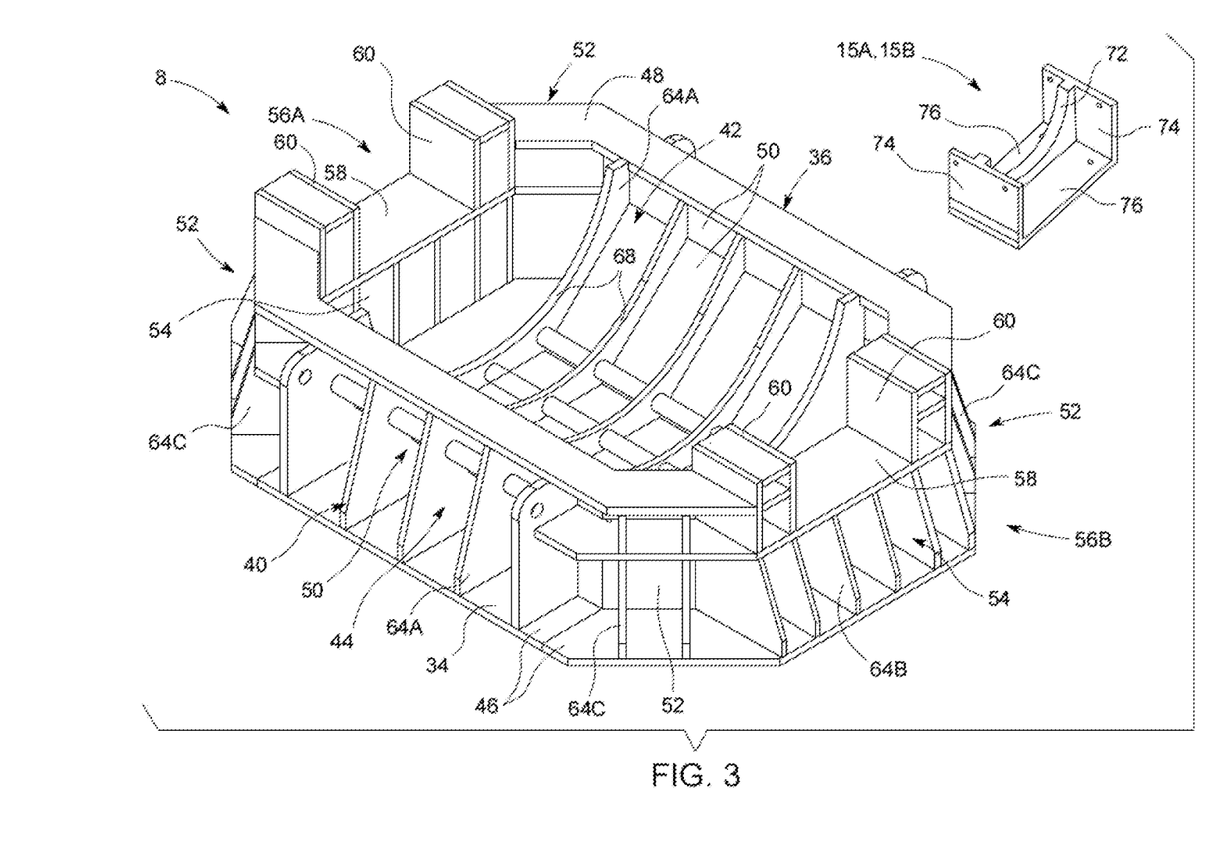
FIG. 3 is a perspective view of the cradle and of the bearing supports of FIG. 1.
Figure 4:
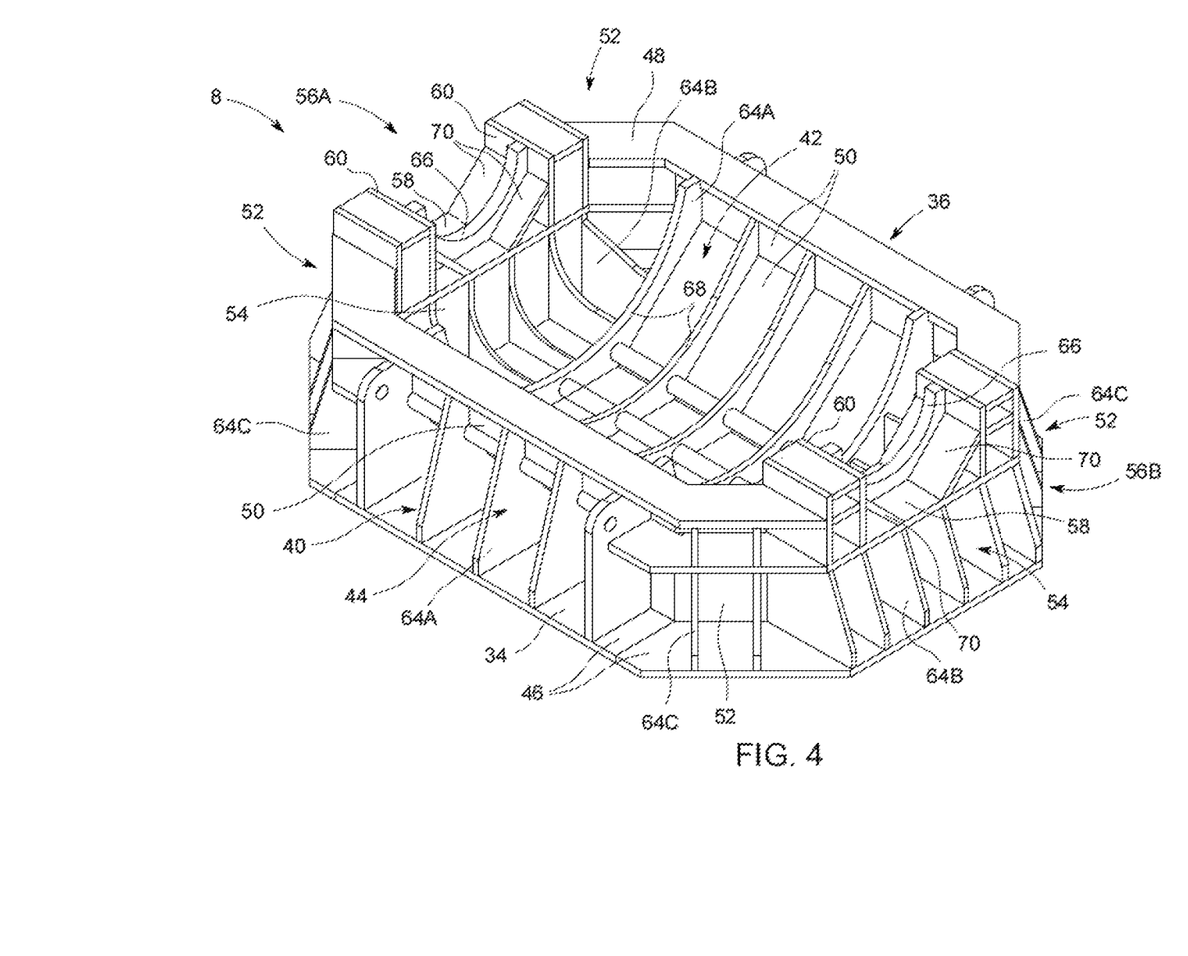
FIG. 4 is a perspective view of the cradle in accordance with a second embodiment.

The cradle 8 comprises a base 34, a frame 36 and a reinforcement armature 40, as shown in FIG. 3 and in FIG. 4.

The base 34 is substantially horizontal and is fixed or placed on the support 4. The base 34 has a substantially octagonal shape extending along the axis X, obtained from a rectangle of which the four corners are beveled.

The frame 36 delimits the cavity 42 for receiving the stator 10. The frame 36 comprises a set of flanks 44, a lower edge 46 and an upper edge 48.

The set of flanks 44 extends vertically in a direction parallel to the vertical axis Z between the lower edge 46 and the upper edge 48. The set of flanks 44 comprises two longitudinal flanks 50 extending in a direction parallel to the axis X, four additional flanks 52 extending obliquely with respect to the axes X and Y and two transverse flanks 54 extending in a direction parallel to the axis Y. Each additional flank 52 mechanically connects one of the longitudinal flanks 50 and one of the corresponding transverse flanks 54. The set of flanks 44 is octagonal in a section in a horizontal plane.

The receiving cavity 42 leads out vertically from the frame 36 solely with respect to the upper edge 48 thereof.

The upper edge 48 comprises two receiving seats 56A and 56B each able to receive a corresponding bearing 16A, 16B. In particular, each of the two seats 56A and 56B comprises a base wall 58 and two side walls 60. The base walls 58 are substantially horizontal and extend in a direction parallel to the axis Y. The side walls 60 are substantially vertical and extend in a direction parallel to the axis Z.

Each of the four corresponding side walls 60 of one of the two receiving seats 56A and 56B may protrude vertically with respect to the upper edge 48. In the example of FIG. 3 each side wall 60 protrudes vertically with respect to the upper edge 48.

The height of the or of each side wall 60, in the vertical direction Z, is greater than or equal to a fifth of the height of the frame 36 in the vertical direction Z, more particularly greater than or equal to a quarter of said height of the frame 36.

The armature 40 comprises a plurality of vertical reinforcement ribs 64 extending in the vertical direction Z between the lower edge 46 and the upper edge 48.

The plurality of vertical reinforcement ribs 64 comprises first vertical ribs 64A, second vertical ribs 64B, and third vertical ribs 64C. The first ribs 64A extend transversely in a direction parallel to the axis Y on either side of the longitudinal flanks 50 and vertically from the base 34. The first vertical ribs 64A comprise an upper edge 68 that is concave with respect to the horizontal support 4, this upper edge 68 being intended to be in abutment, or to form a seal, against the stator 10. The vertical ribs 64A thus form a cavity matching the stator as closely as possible, making it possible to receive the stator once the machine 6 has been assembled and making it possible to add rigidity to the cradle 8 in the direction parallel to the axis Y. The second ribs 64B each extend vertically between the lower edge 46 and a corresponding base wall 58 and against a corresponding transverse flank 54. In a variant, as shown in FIG. 4, the second ribs 64B extend between a transverse flank 54 and the closest first vertical rib 64A, so as to add rigidity to the cradle 8 in a direction parallel to the axis X. The third ribs 64C extend vertically between the lower edge 46 and the upper edge 48 and against each of the corresponding additional oblique flanks 52.

The operation of the electric motor 6 is known per se, and hereinafter solely the mechanical behavior of the cradle 8 when the motor 6 is operational will be described.

A person skilled in the art will understand the benefit which is to reduce the weight of the cradle 8, to reduce the amplitude of the vibrations of the cradle 8 and of the bearings 16 and 16B, and to facilitate the maintenance of the electric motor 6 by means of easier disassembly of the rotor 12.

The arrangement of the armature 40, in particular of the vertical reinforcement ribs 64 and the octagonal shape of the cradle 8, makes it possible to reduce the weight of the cradle 8 with respect to the cradle of the prior art of substantially parallelepipedic shape. In effect, the beveled corners of the cradle according to an embodiment make it possible to reduce the weight of the cradle.

The use of bearings 16A and 16B of the flange-mounted type, as shown in FIGS. 1 and 2, makes it possible to provide a greater rigidity of the bearings in the transverse direction parallel to the axis Y. In effect, the bearings of the foot-mounted type have a transverse rigidity that is much lower than the vertical rigidity, for example a transverse rigidity equivalent to just 40% of the vertical rigidity. The bearings 16A and 16B of flange-mounted type as used in an embodiment have a transverse rigidity much closer to the vertical rigidity, for example a transverse rigidity equivalent to 80% of the vertical rigidity.

A person skilled in the art will understand the benefit of using this type of bearing 16A and 16B of the flange-mounted type with transverse and vertical rigidities that are close to one another and uniform, thus preventing a splitting into two of the frequencies of the rotor in the event of deflection thereof in the transverse and vertical plane. By avoiding this splitting into two of the critical speeds with strong vibrations of deflection of the rotor 12 in rotation, the range of comfortable rotational speeds posing no risk to the electric motor 6 is increased.

For the treatment of the vibrations of the bearings in the axial direction parallel to the axis X, the bearings 16A and 16B are fixed by their flange, which represents a half-circumference, to a rigid and removable structure, referred to as a bearing support 15A, 15B. The bearing support 15A, 15B comprises a vertical rib 72 having an upper concave edge making it possible to receive the mounting flange of the bearings 16A, 16B. This rib is in abutment against the base wall 58, or is fixed to the base wall 58, and extends transversely between two side walls 74 fixed to the side walls 60 of the cradle 8. The two side walls 74 of the bearing supports are of substantially the same size as the side walls 60, and are fixed by screws or bolts to the side walls 60. In a variant, the bearing support 15, 15B comprises a base wall 76 below the vertical rib 72 of the bearing support, extending horizontally between the two side walls 74 of the bearing support, and in abutment against the base wall 58 of the cradle 8. The base wall 76 of the bearing support is substantially of the same size as the base wall 58.

In accordance with another variant the base wall 76 of the bearing support is fixed by screws or bolts to the base wall 58. In accordance with yet a further variant (not shown), oblique ribs extend axially on either side of the vertical rib 72 of the bearing support 15A, 15B and obliquely with respect to the axes Y and Z between the base wall 76 and the side walls 74 of the bearing support 15A, 15B.

The removable bearing supports 15A, 15B are received in their receiving seat 56A, 56B and are firmly connected to the receiving seat 56A, 56B and therefore to the cradle 8 by fixing means of the screw or bolt type. Thus, the cradle 8 and the two receiving seats 56A and 56B make it possible to recess the bearing supports and to considerably increase the axial rigidity of the bearings 16A and 16B with respect to an arrangement of bearings of the foot-mounted type, fixed at their foot to the cradle 8.

In the case of these high-power electric motors 6 having a high rotational speed, in particular with bipolar polarity, the radial pulsating forces of the stator 10 transmitted in the transverse direction to the cradle 8, by means of the frame 36, at which the stator 10 is fixed to the cradle 8, cause a transverse deformation of the cradle 8, which by means of induced deformation, drives in quadrature an axial deformation of the cradle 8 at the seats 56A, 56B and the bearings 16A, 16B.

An embodiment of the invention thus proposes limiting the axial vibrations of the bearings 16A and 16B by a recessed fixing of the bearings in the seats 56A, 56B, as explained beforehand, but also by the octagonal design of the cradle 8, in particular of the base 34 and of the frame 36. A person skilled in the art will understand that the beveled corners of the cradle 8, in the zone of the oblique flanks 52 and of the ribs 64C, make it possible in a manner of speaking to decouple the deformations between the sides in quadrature of the cradle 8, and in particular to provide a decoupling between the transverse vibrations induced by the stator 10 of the cradle 8 and the zone in quadrature of the transverse flanks 54.

Thus, the octagonal shape of the cradle 8 with its beveled corners significantly reduces the transverse-axial coupling of the transverse vibrations of the stator 10 generating axial vibrations of the bearings 16A and 16B, these latter vibrations reducing the service life of the bearings.

Figure 5:
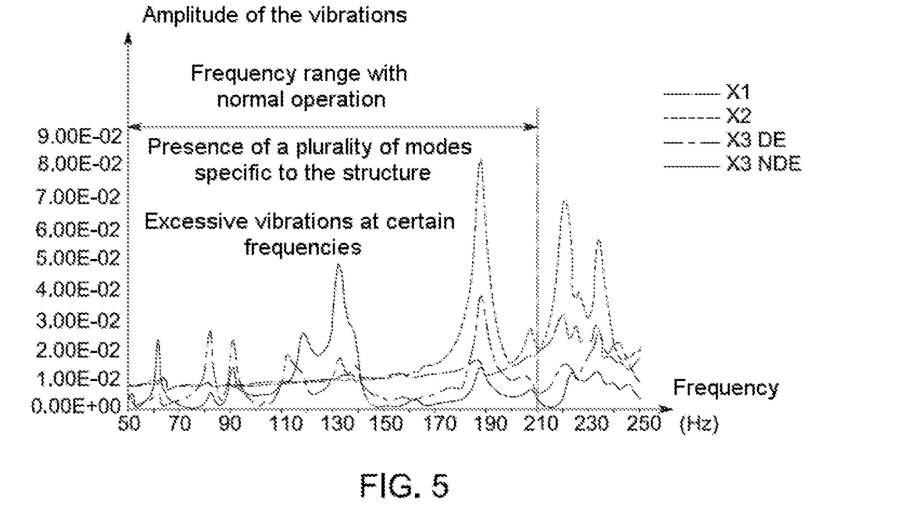
FIG. 5 is a set of curves showing the amplitude of the vibrations at a bearing as a function of the rotational speed of the transmission shaft for a cradle of the prior art.
Figure 6:
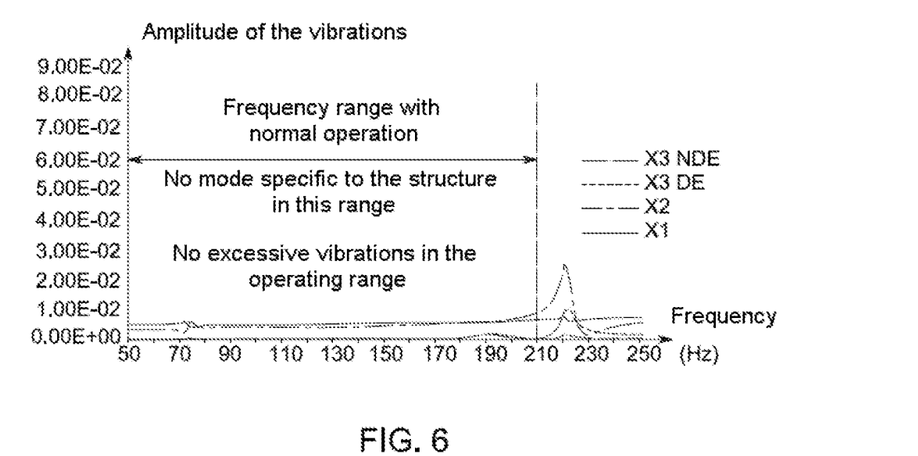
FIG. 6 is a set of curves showing the amplitude of the vibrations at a bearing as a function of the rotational speed of the transmission shaft for the cradle of FIG. 3, or of FIG. 4.

FIGS. 5 and 6 show a set of curves illustrating the benefit of the cradle 8. The cradle 8, due to its octagonal design and its seats 56A and 56B, makes it possible to add rigidity axially to the bearings 16A and 16B, to eliminate a number of modes specific to the structure of the cradle according to the prior art (FIG. 5), or to shift the modes specific to the structure of the cradle toward frequencies outside the range of rotational speeds of the electric motor 6 in operation, as shown in FIG. 6, for a cradle 8.

Thus, the cradle 8 according to an embodiment makes it possible to reduce the amplitude of the vibrations induced by the motor, taken up on the cradle 8 at the bearing 16A, 16B, in particular for rotational speeds of the rotor below the nominal speed thereof, enabling a greater range of operation of the motor 6 with regard to the rotational speed thereof, in particular if the motor 6 is operated at variable speed. This is shown in FIG. 6, in which the range of rotational speeds of the rotor, without excessive vibration amplitude, is significantly more extended than that shown in FIG. 5, improving the comfort of operation of the motor 6 according to an embodiment, as well as the service life thereof.

The size of the receiving seat 56A and 56B is fixed as a function of the size of the mounting flange of the bearings 16A and 16B, but also as a function of the outer diameter of the magnetic mass 26 of the rotor 12, thus enabling a disassembly or an insertion of the rotor 12 in the axial direction following the axis of rotation R thereof parallel to the axis X, once the bearing supports 15A and 15B have been unscrewed or unbolted from the cradle 8, since the bearing supports 15A and 15B are removable. The size of the seat 56A, 56B prevents any contact with the rotor 12 during an axial displacement of the rotor 12, thus greatly facilitating the assembly of the rotor 12 in the electric motor 6, or a maintenance operation requiring disassembly in the axial direction of the rotor 12.

Some high-power electric machines require disassembly from above of all the parts of the motor so as to be able to vertically disassemble the stator and the rotor, which makes the assembly and more particularly the maintenance and repair of the motor very complicated.

The electric motor 6 according to an embodiment as well as the cradle 8 thereof provided with seats 56A and 56B considerably facilitates the assembly or maintenance of the rotor 12 by allowing an axial movement of the rotor 12 without contact with the cradle 8.

In accordance with a second embodiment illustrated in FIG. 4, if the size of the mounting flange of the bearings 16A and 16B is greater than the outer diameter of the rotor 12, the bearings are no longer fixed to the bearing supports 15A and 15B recessed in the cradle 8, but are directly fixed to a vertical rib 66 in the seat 56A, 56B. This vertical rib 66 comprises a concave upper edge making it possible to receive the mounting flange of the bearings 16A and 16B. The vertical rib 66 extends vertically from the base wall 58 and transversely in a direction parallel to the axis Y between the side walls 60. In a variant, in order to add even more rigidity to the vertical rib 66 in the axial direction, oblique ribs 70 can be incorporated in the seat 56A, 56B, extending axially on either side of the vertical rib 66 and obliquely with respect to the axes Y and Z between the base wall 58 and the side walls 60. In accordance with this second embodiment the axial rigidity of the bearings 16A and 16B is thus increased, limiting the axial vibrations of the bearings 16A and 16B, whilst allowing an assembly or a disassembly of the rotor 12 in the axial direction without contact with the cradle 8.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A cradle for an electric machine having a stator, a transmission shaft; a rotor connected to the shaft; two bearings of a flange mount type for supporting the transmission shaft, the cradle comprising: a frame delimiting a seat for receiving part of the machine, the frame extending in a vertical direction and comprising a lower edge and an upper edge, the lower edge being intended for connection to a support, wherein the upper edge comprises one or two receiving seats, each receiving seat being able to receive a respective bearing and comprising a base wall and two side walls, and wherein that the frame comprises two longitudinal flanks extending substantially in a longitudinal direction, two transverse flanks extending substantially in a transverse direction and an additional flank extending obliquely with respect to the longitudinal and transverse directions and mechanically connecting one of the longitudinal flanks and one of a corresponding transverse flank of the two transverse flanks.

2. The cradle as claimed in claim 1, further comprising, for at least one receiving seat, two side walls protruding with respect to the upper edge of the frame in the vertical direction.

3. The cradle as claimed in claim 1, further comprising at least one removable bearing support, which is fixed in the seat and on which the bearing is fixed, said bearing support being suitable for increasing the rigidity of the bearings in the axial direction and for disassembling or assembling the rotor in the electric machine in the axial direction without contact with the cradle, and in that the bearing support also comprises at least one vertical rib having a concave upper edge able to receive a mounting flange of the bearing, the vertical rib being in abutment against or fixed to the base wall and extending transversely in a transverse direction between two side walls fixed to the side walls of the cradle.

4. The cradle as claimed in claim 1, further comprising at least one seat comprising a vertical rib having a concave upper edge suitable for receiving a mounting flange of the bearing, the vertical rib extending vertically from the base wall and transversely in a transverse direction between the side walls.

5. The cradle as claimed in claim 4, wherein at least one seat comprises oblique ribs extending in the longitudinal direction from one side or from either side of the vertical rib, and obliquely with respect to the transverse and vertical directions between the base wall and the side walls.

6. The cradle as claimed in claim 1, wherein a height of each side wall in the vertical direction is equal to at least a fifth of a height of the frame in the vertical direction.

7. The cradle as claimed in claim 1, wherein the frame comprises four additional flanks and is octagonal in a section in a plane perpendicular to the vertical direction.

8. The cradle as claimed in claim 1, wherein the frame also comprises vertical reinforcement ribs extending in the vertical direction between the lower edge and the upper edge.

9. A transmission system comprising
an electric machine comprising a stator, a transmission shaft, a rotor connected to the shaft, and two bearings of a flange mount type for supporting the transmission shaft, and
a cradle able to receive said machine comprising a frame delimiting a seat for receiving part of the machine, the frame extending in a vertical direction and comprising a lower edge and an upper edge, the lower edge being intended for connection to a support, wherein the upper edge comprises one or two receiving seats, each receiving seat being able to receive a respective bearing and comprising a base wall and two side walls, and wherein the frame comprises two longitudinal flanks extending substantially in a longitudinal direction two transverse flanks extending substantially in a transverse direction and mechanically connected to the longitudinal flanks and an additional flank extending obliquely with respect to the longitudinal and transverse directions and mechanically connecting one of the longitudinal flanks and one of a corresponding transverse flank of the two transverse flanks.

* * * * *